United States Patent [19]

Nose et al.

[11] Patent Number: 5,000,572
[45] Date of Patent: Mar. 19, 1991

[54] DISTANCE MEASURING SYSTEM

[75] Inventors: Noriyuki Nose, Machida; Minoru Yoshii, Tokyo; Yukichi Niwa; Ryo Kuroda, both of Atsugi, all of Japan

[73] Assignee: Canon Kabushiki Kaisha, Tokyo, Japan

[21] Appl. No.: 542,656

[22] Filed: Jun. 25, 1990

Related U.S. Application Data

[63] Continuation of Ser. No. 462,291, Dec. 29, 1989, abandoned, which is a continuation of Ser. No. 190,247, May 4, 1988, abandoned.

[30] Foreign Application Priority Data

| May 11, 1987 | [JP] | Japan | 62-112263 |
| May 11, 1987 | [JP] | Japan | 62-112264 |
| May 11, 1987 | [JP] | Japan | 62-112265 |
| May 11, 1987 | [JP] | Japan | 62-112266 |

[51] Int. Cl.⁵ ............................................. G01B 9/02
[52] U.S. Cl. ................................................. 356/356
[58] Field of Search ................ 356/351, 354, 355, 356

[56] References Cited

U.S. PATENT DOCUMENTS

| 3,254,227 | 5/1966 | Hock | 250/235 |
| 3,891,321 | 6/1975 | Hock | 356/351 X |
| 4,577,968 | 3/1986 | Mokosch | 356/356 |
| 4,676,645 | 6/1987 | Taniyuchi et al. | 356/356 |
| 4,733,065 | 3/1988 | Hoshi et al. | 250/201 |
| 4,815,580 | 3/1989 | Kanayama et al. | |

FOREIGN PATENT DOCUMENTS

| 0045321 | 2/1982 | European Pat. Off. |
| 0163362 | 12/1985 | European Pat. Off. |
| 3504194 | 6/1986 | Fed. Rep. of Germany |
| 3702203 | 7/1987 | Fed. Rep. of Germany |
| 58-191906 | 11/1983 | Japan |
| 58-191907 | 11/1983 | Japan |
| 62-25212 | 3/1987 | Japan |
| 997405 | 7/1965 | United Kingdom |
| 1306632 | 2/1973 | United Kingdom |
| 1367886 | 9/1974 | United Kingdom |

Primary Examiner—Vincent P. McGraw
Assistant Examiner—Matthew W. Koren
Attorney, Agent, or Firm—Fitzpatrick, Cella, Harper & Scinto

[57] ABSTRACT

A device for measuring a moving distance of two relatively moving objects includes a first diffraction grating provided on one of the two objects and disposed along the relatively moving direction of the two objects, and a measuring portion provided on the other object. The measuring portion includes a second diffraction grating, a light source and a photodetecting system, wherein the light source provides lights which are projected upon two points on the second diffraction grating so that they emanate from the two points in the form of diffraction lights having different diffraction orders. The diffraction lights are directed to the same point on the first diffraction grating and are diffracted again by the first diffraction grating so that they are emitted in the same direction, and the photodetecting system is operable to detect a change in the light intensity caused due to the interference of the two lights emanating from the first diffraction grating. The device further includes a detecting system for detecting the relative moving distance of the two objects on the basis of the detection by the photodetecting.

18 Claims, 11 Drawing Sheets

DISTANCE MEASURING SYSTEM

This application is a continuation of application Ser. No. 07/462,291 filed Dec. 29, 1989 which is a continuation of application Ser. No. 07/190,247 filed May 4, 1988, both now abandoned.

FIELD OF THE INVENTION AND RELATED ART

This invention relates to a distance measuring system and, more particularly, to a grating interference type (interferometric) distance measuring system.

As disclosed in Japanese Laid-Open Patent Applications, Laid-Open Nos. Sho58-191906 and Sho58-191907, conventional grating interference type distance measuring devices are arranged so that a coherent light from a light source is directed by way of a mirror or otherwise to a diffraction grating which functions as a reference measure, and positive N-th order diffraction light and negative N-th order diffraction light emanating from this diffraction grating are reflected by use of corner cubes backwardly in parallel to their oncoming paths, wherein the reflected diffraction lights are incident again upon the diffraction grating whereat the two positive and negative N-th order diffraction lights are diffracted in the same direction to cause mutual interference and wherein the intensity of such interference light is detected by use of a photosensor.

In the described arrangement, the corner cube is an optical member which is not easy to manufacture and, therefore, is expensive. Also, the adjustment of optical members such as mirrors is complicated. Therefore, with the conventional arrangement, it is difficult to make the structure simple and compact and to reduce the manufacturing cost Further, with such an interferometer, the measuring stroke can be made relatively large such as of an order of not less than 100 mm. On the other hand, basically, the distance measurement is made by using, as a unit length, a particular pitch which is determined by optical conditions such as the wavelength of measuring light, the order of diffraction light and the state of polarization. Accordingly, the resolution is low and, therefore, the precision is low where a minute distance of an order not greater than submicrons, for example, is to be measured.

SUMMARY OF THE INVENTION

It is accordingly a primary object of the present invention to provide a grating interference type distance measuring device which is simple in structure and which allows easy assembling adjustment.

It is a second object of the present invention to provide a grating interference type distance measuring device which allows reduction in size of the device, suppression of noise and improvements in the measuring precision.

It is a third object of the present invention to provide a grating interference type distance measuring device which is stable against variation in the wavelength of a light source without use of any corner cube.

It is a fourth object of the present invention to provide a grating interference type distance measuring device which has a large stroke and very high measuring precision.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
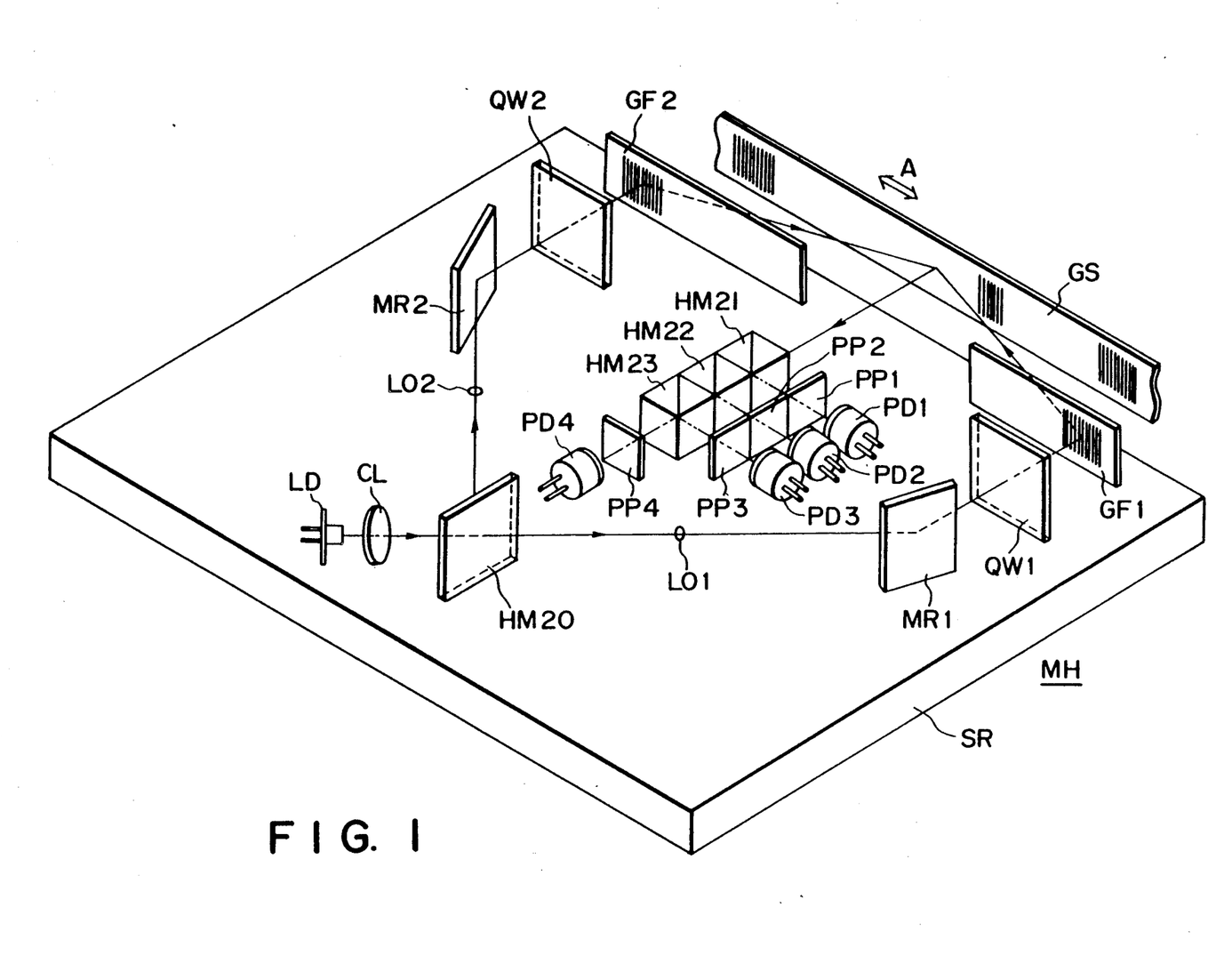
FIG. 1 is a schematic view showing the structure of a diffraction grating interferometric distance measuring device according to an embodiment of the present invention, wherein no corner cube is used.

FIG. 1 shows an example of a diffraction grating interferometric distance measuring device which is constructed without use of any corner cube member as the pulse signal producing means. In FIG. 1, a relatively movable diffraction grating GS is fixedly provided on one of two objects which are movable relative to each other, and a distance measuring head portion MH is fixedly provided on the other of the two objects.

A laser beam emitted from a light source LD (for example, a semiconductor laser) of the distance measuring head portion MH is transformed into a plane wave by means of a collimator lens CL and then is divided into two by means of a half mirror MH20. The split two light beams L01 and L02 are reflected by mirrors MR1 and MR2, respectively, and are incident upon quarter waveplates QW1 and QW2. Thereafter, they are diffracted by stationary gratings GF1 and GF2, respectively. Positive and negative N-th order diffraction lights LN1 and LN2 are projected upon the relatively moving grating GS whereat they are reflectively diffracted again, such that they go back in the same direction and are combined with each other. The thus obtained light is separated by half mirrors HM21-HM23 and, after being converted into electric signals by means of the combination of polarization plates PP1-PP4 and sensors (photodetectors) PD1-PD4, they are extracted. The quarter waveplates QW1 and QW2 disposed on the paths of the light beams L01 and L02 are preparatorily set so that their fast axes are inclined by respective angles +45 degrees and −45 degrees with respect to a linearly polarized light component of the laser beam. Further, the angular positions of the polarizing plates PP1-PP4 are so set that their orientations of polarization become equal to 0 degree, 45 degrees, 90 degrees and 135 degrees, respectively.

Figure 2:
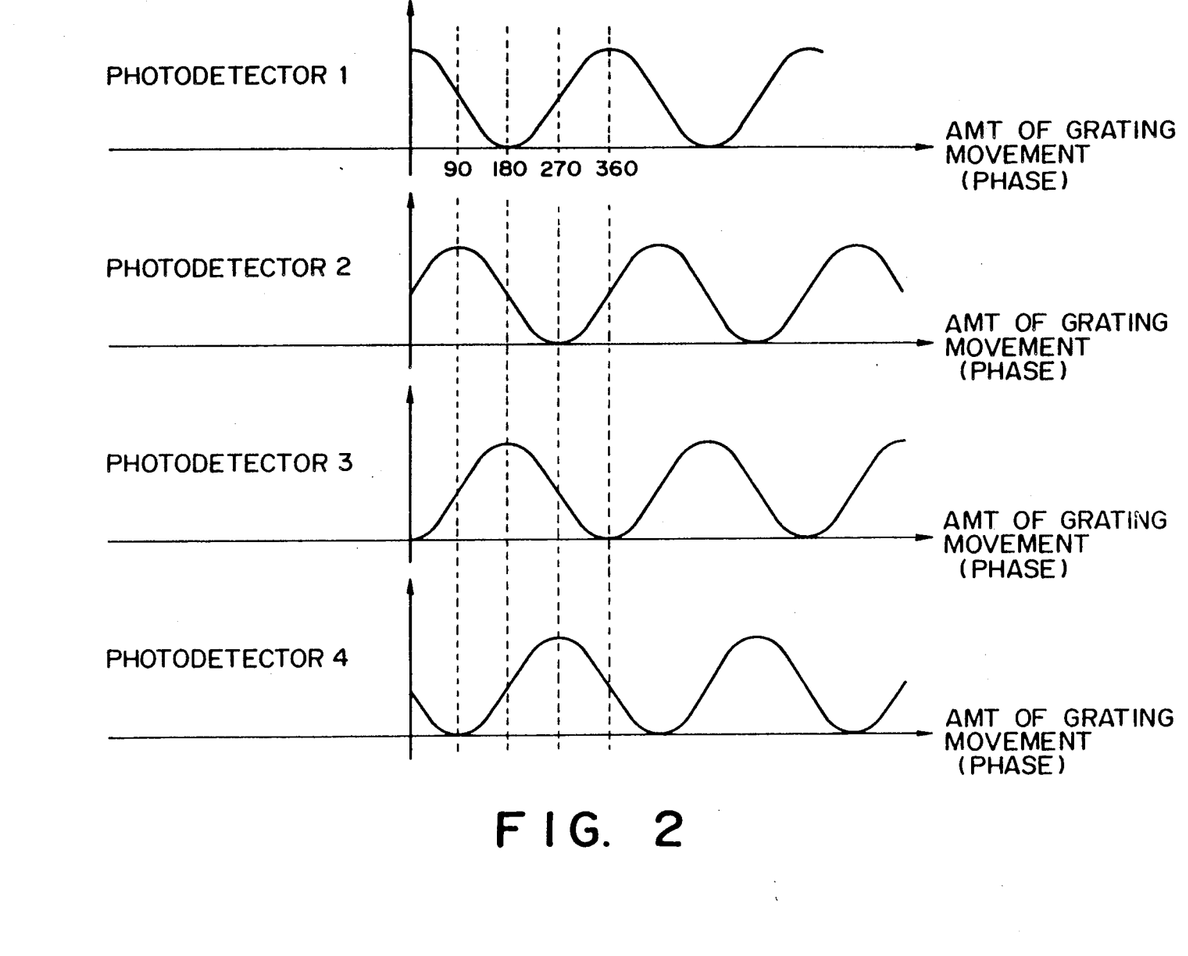
FIG. 2 is a waveform view showing outputs of photodetectors used in the FIG. 1 embodiment.

With this arrangement, the quantity of each light impinging upon corresponding one of the sensors PD1-PD4 changes, as shown in FIG. 2, with the movement of the relatively movable grating GS, and these changes are detected as light quantity detecting outputs. Namely, from the sensors PD1-PD4, output signals whose phases are shifted successively by a phase difference of 90 degrees.

Then, for each two signals whose phases are relatively shifted by 180 degrees, a difference signal is formed. Namely, two difference signals are formed. These two difference signals have a phase difference of 90 degrees and are shown at R and S in upper two parts (a) and (b) of FIG. 3.

Figure 3:
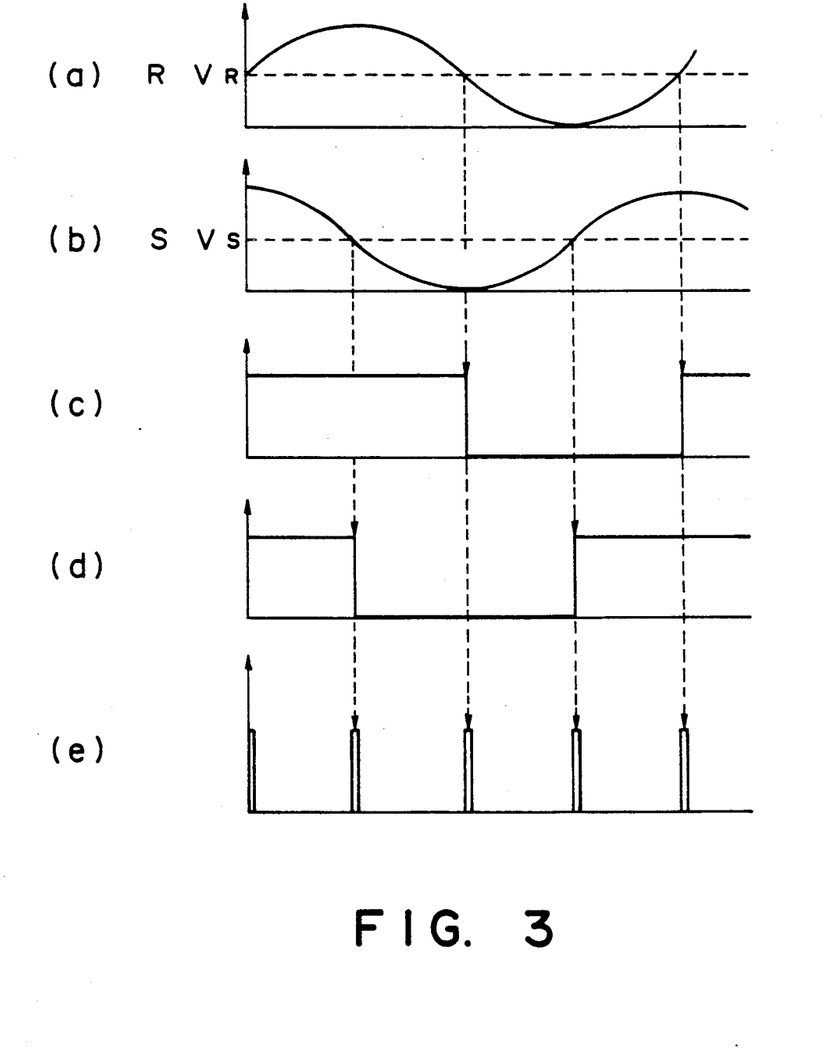
FIG. 3 is a waveform view of those signals as obtainable by processing the outputs illustrated in FIG. 2.

By use of electric circuits (not shown) and on the basis of a predetermined level, these two signals R and S are binarized (binary-coded) such as depicted in parts (c) and (d) of FIG. 3; and four pulses per one cycle are produced at the timings of rise and fall of the binarized signals, as shown in a part (e) of FIG. 3. By counting the number of pulses, it is possible to measure the amount of relative movement between the measuring head MH and the diffraction grating GS. In this case, for the relative movement of an amount corresponding to one pitch of the diffraction grating GS, the interference light intensity changes through four cycles and, thus, sixteen (16) pulses are produced. Also, at the time of pulse counting, the direction of said relative movement is detected and, in accordance with the result of detection, whether or not the counted number should be added or subtracted is determined. The moving direction can be discriminated from such level of each signal, shown at the parts (c) and (d) of FIG. 3, as created at the timing of generation of each pulse shown at a part (e) of FIG. 3. If, for example, the level of the signal shown in the part (d) as created at the timing of the fall of the signal shown in the part (c) is "high" in an occasion where the movement is in the positive direction, such level becomes "low" in an occasion where the movement is in the negative or reverse direction.

The signals R and S shown in the parts (a) and (b) of FIG. 3 may be added and subtracted so as to produce signals "R+S" and "R−S" having phase differences of 45 degrees with respect to the signals R and S, respectively; these signals may be binarized in a similar manner so that pulses are produced at the timings of rise and fall. By doing so, it is possible to obtain thirty-two (32) pulses for the movement of an amount corresponding to one pitch of the diffraction grating GS.

Figure 4:
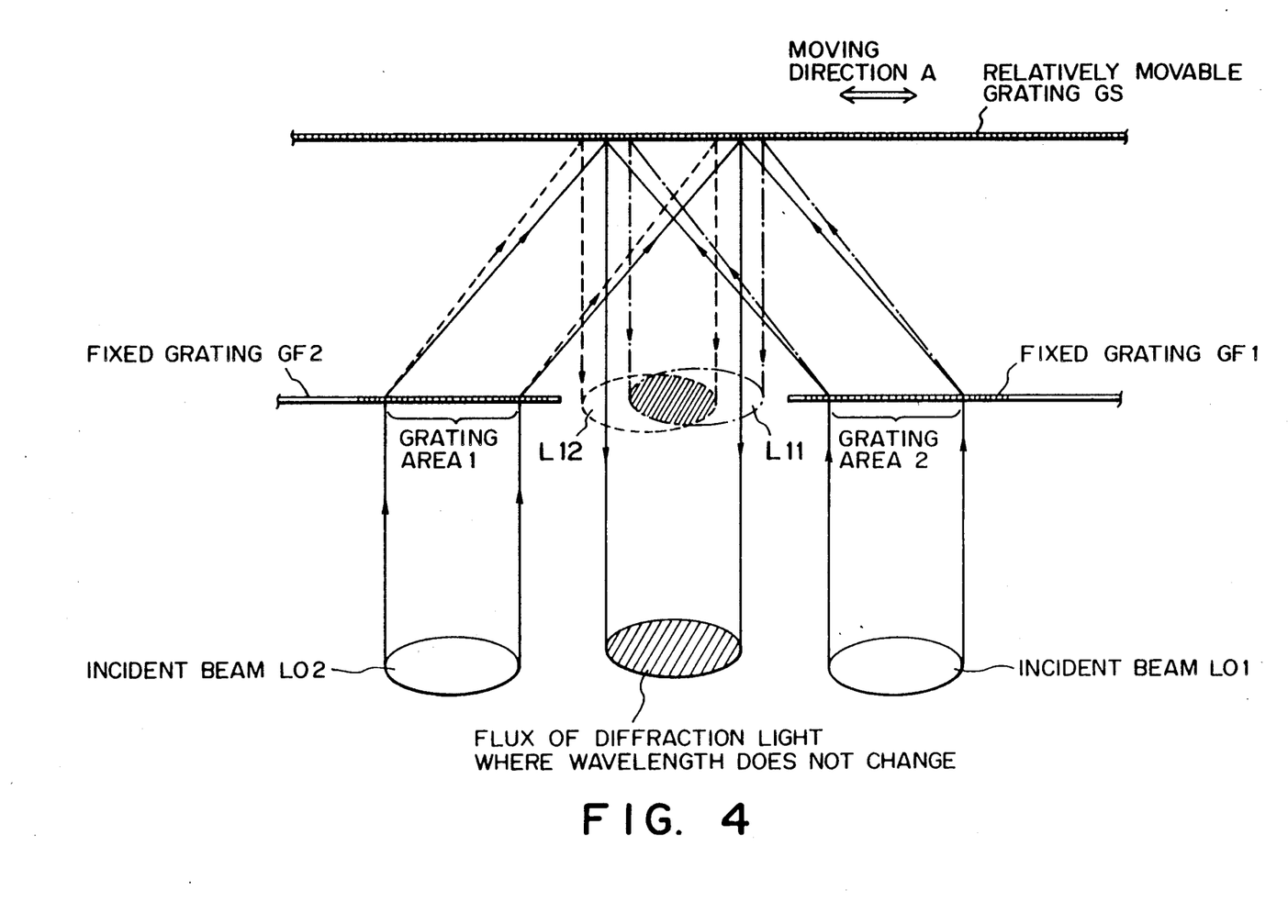
FIG. 4 is a schematic view explicating the state of diffraction light where the output wavelength of a light source changes, in the case of the distance measuring device of the FIG. 1 embodiment.

FIG. 4 shows the state of diffraction lights where, in the distance measuring system of the FIG. 1 example, the output wavelength of the light source LD shifts.

Figure 5:
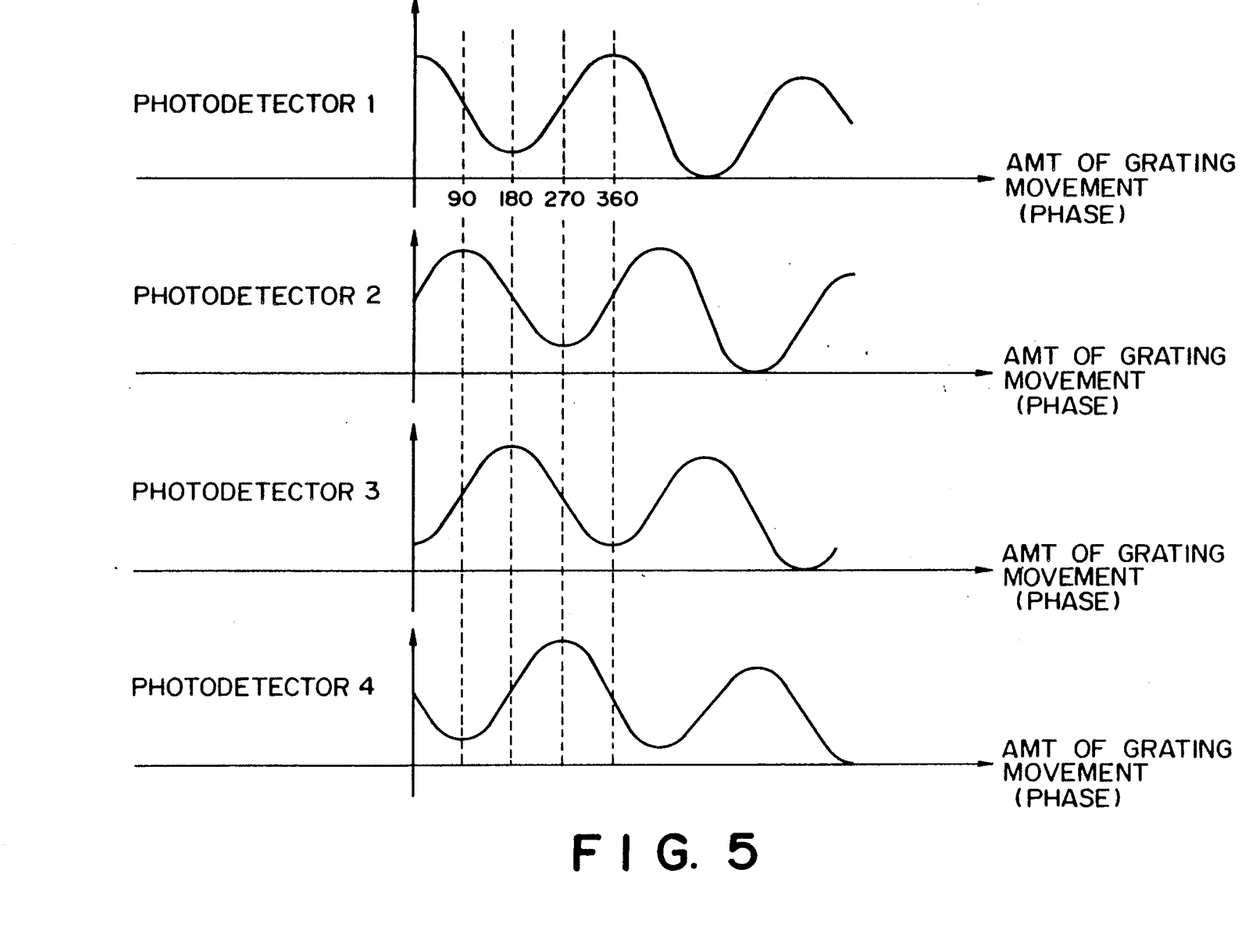
FIG. 5 is a waveform view showing outputs of photodetectors of the FIG. 1 embodiment where the wavelength of light from the light source is shifted.

In FIG. 4, the paths of lights where the adjustment is substantially perfect are depicted by solid lines, whereas the paths of lights where the wavelength is shifted are depicted by dash-and-dot lines. Thus, the light fluxes as denoted at L11 and L12 in this Figure depict, respectively, the diffraction lights caused when the wavelength has been shifted. The outputs of the sensors PD1-PD4 when there occurs such a wavelength shift are such as depicted in FIG. 5. Independently of the amount of movement of the relatively movable grating GS, a so-called bias component is included in each of the outputs of the sensors. The reason for this is that a light flux area (in which no interference fringe is formed) other than the interference area as depicted by hatching in FIG. 4 increases and that the extent of the light flux area in which no interference fringe is formed changes with the amount of shift in the wavelength. Accordingly, there occur those changes as being depicted in the signal waveforms of the outputs of the photodetectors PD1-PD4 shown in FIG. 5. However, in an occasion where the processing is going to be made on the basis of four detection signals having successive phase differences of 90 degrees, the division with respect to the period of signals can be made with good precision even if the wavelength shifts.

Namely, since similar variation components are included in these four signals, it is possible to cancel such variation components by detecting the difference between those two signals as having a phase difference of 180 degrees. As a result, the DC levels $V_R$ and $V_S$ of these difference signals R and S are not affected by the variation in the wavelength and, therefore, become constant. Accordingly, high precision is assured when these signals are used for the processing.

If only two sensors are used and if it is desired to obtain pulses of the same pitch as in the case using four sensors, by electrically processing two kinds of signals having phases of 0 degree and 90 degrees, then the precision of electric division of the signals will be deteriorated as a result of any shift of the wavelength.

Where light is projected upon a grating with an arrangement such as disclosed in Japanese Laid-Open Patent Applications, Laid-Open Nos. Sho58-191906 and Sho58-191907, the direction of diffraction thereof (namely the angle) changes with the change in the wavelength of the light. To meet such characteristics, corner cubes are used. The corner cube is a prism formed to define an angle of 90 degrees between multiple surfaces so that the reflected light goes back in the same direction as the incident light. The corner cube requires high machining accuracy so that it is expensive. Further, the size is large.

In the device of FIG. 1, diffraction grating means (stationary gratings GF1 and GF2) are provided also on the distance measuring head portion MH side, in addition to the movable grating GS, so that the positive and negative N-th order diffraction lights from the stationary gratings are diffracted again by the movable grating, the last diffracted lights advancing along the same path to the sensor. Accordingly, without use of any corner cube described above, interference light whose brightness changes with the movement of the movable grating is obtainable when the wavelength changes. In other words, the described grating interferometric distance meter has good stability to the change in the wavelength without use of any corner cube. Therefore, the cost and size of the device can be reduced. Further, the described structure facilitates integration of the components into a compact device, as will be described later.

Where a grating interferometric distance measuring device is formed by a light source, a half mirror, corner cubes, polarizing plates, detectors and so on which are three-dimensionally combined, there is a possibility of deterioration of the distance measuring accuracy due to inclusion of an error into an interference signal, as a result of mechanical variation between optical components, temperature change or irregular flow of an air. Also, separate provision of the light source, the detecting system and so on leads to the bulkiness in volume occupying a space. It is not difficult to make the structure compact. Moreover, because of the spatial distance from the detecting system to the processing circuit, noise is easily mixed into the signal, causing deterioration of the measuring precision.

Figure 6:
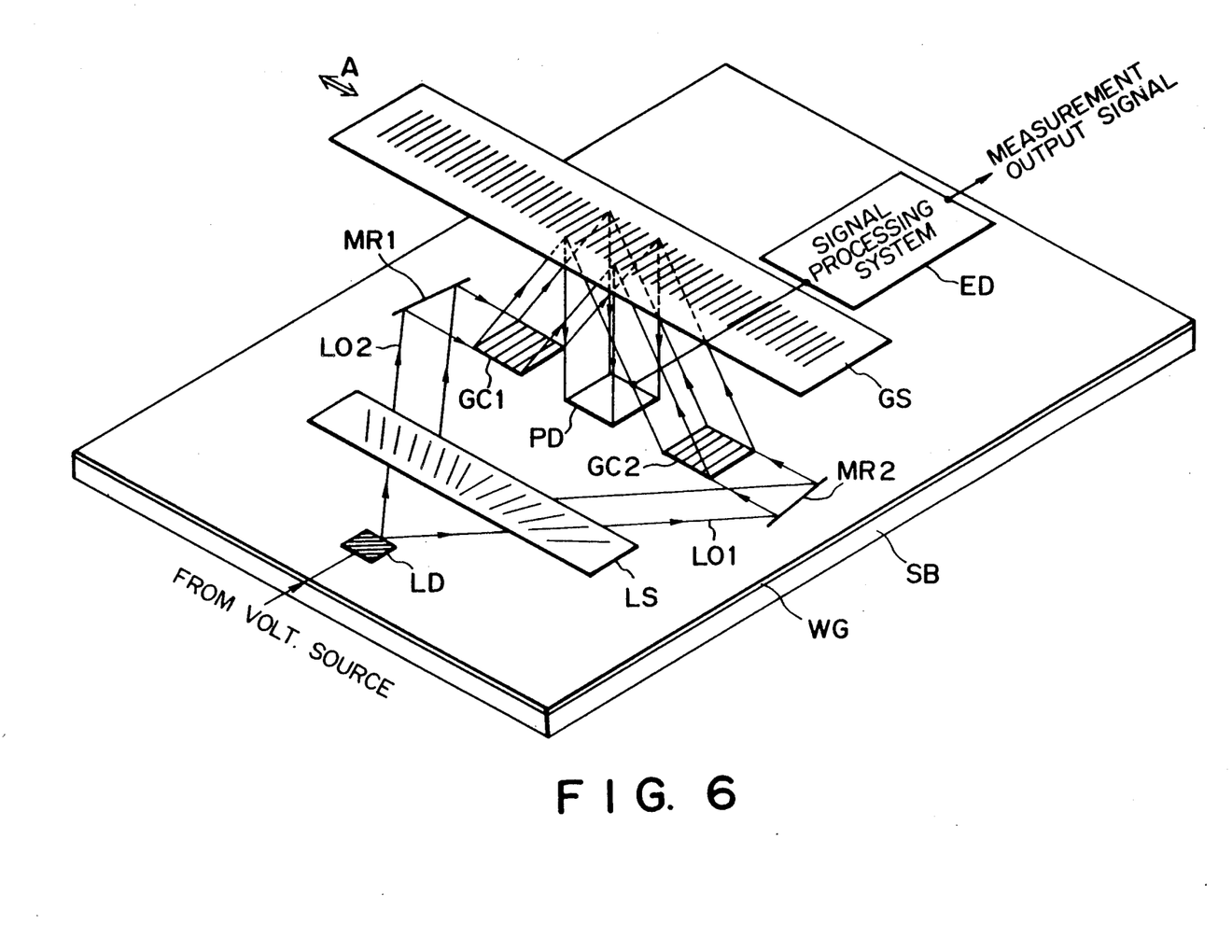
FIG. 6 is a schematic view of a grating diffraction type distance measuring device according to another embodiment of the present invention, wherein a major portion of the device is formed into an integrated circuit device.

FIG. 6 shows an example wherein major components of a diffraction grating distance measuring device are formed into an "integrated circuit". In this example, a portion which corresponds to an optical system of the distance measuring head portion MH of the distance meter of the FIG. 1 embodiment and a signal processing electric system effective to produce pulses in accordance with the brightness/darkness of the interference light, are formed on a base plate of GaAs.

As shown in this Figure, a dielectric waveguide layer WG is formed on the GaAs base member SB, and the light wave is propagated along a preset optical path.

Light source LD can be formed on the GaAs base plate SB by use of molecular beam epitaxy method, for example. A lens and beam splitter portion LS formed in the waveguide layer WG is effective to transform a diverging light from the light source LD into a parallel light and, then, divide the same along two directions. Grating couplers GC1 and GC2 each effective to emit, at a certain angle, the light wave propagated through the thin film waveguide WG, outwardly to the outside space.

Reference diffraction grating GS corresponds to the movable grating GS of the distance meter of the FIG. 1 embodiment, and is effective to diffract the light waves from the grating couplers GC1 and GC2 toward the same direction. Photodetector PD is provided to detect the interference light intensity of the diffraction light from the reference diffraction grating GS.

Next, the operation will be described.

The light wave from the light source LD is propagated through the waveguide WG and, by means of the lens and beam splitter portion LS, it is transformed into two parallel lights L01 and L02 which are propagated through the waveguide WF in different directions. Each of the lights L01 and L02 is reflected within the waveguide WG by corresponding one of mirrors MR1 and MR2 so that it advances in parallel to the lengthwise direction of the reference grating GS. The reflected lights from the mirrors MR1 and MR2 are incident on the grating couplers GC1 and GC2. The grating couplers GC1 and GC2 each functions to emit the light wave, having been propagated through the waveguide WG, from the surface of the base plate to the outside at a preset angle and through the waveguide surface. This angle is related to the pitch of the reference grating GS and the wavelength of the light. If a reference grating having a pitch p=1.6 micron is used, and where the wavelength λ=0.83 micron, then the angle of emission is 58.8 degrees.

The two light waves from the grating couplers GC1 and GC2 are perpendicularly diffracted by the reference diffraction grating GS and are incident on the photodetector PD. The photodetector PD operates to photoelectrically convert the interference intensity of the two diffraction lights.

Next, the principle of operation as a distance meter will be explained.

The light waves emitted to the outside space by means of the grating couplers GC1 and GC2 are diffracted by the reference grating GS, as described. The intensity distribution of the diffraction light produced at that time can be expressed by the following equation:

$$I = I_0 + I_1 \cos[2\pi \cdot X / \{p/(m-n)\}]$$

wherein
X: the amount of relative change between the base plate and the reference grating;
p: the pitch of the reference diffraction grating;
m: the order of diffraction, by the reference diffraction grating of the light from the grating coupler GC1;
n: the order of diffraction, by the reference diffraction grating of the light from the grating coupler GC2;
$I_0$: the DC level; and
$I_1$: the signal amplitude.

Assuming now that m=+1, n=−1 and p=1.6 micron, then the intensity distribution I can be determined by:

$$I = I_0 + I_1 \cos[2(X/0.8)]$$

It is seen therefrom that, each time the reference grating GS moves through 0.1 micron pitch, a sine wave signal of one cycle is produced. The detector PD is operable to count the cycles of such sine wave signals, so that the amount of movement of the reference grating GS can be measured.

The grating interference type distance measuring device of the present embodiment has a light source, optical members and a detection system processing circuit which are integral on the same base plate. Accordingly, the size can be reduced and the noise can be suppressed and, additionally, higher precision is attainable.

Description will now be made of the means for detecting the moving direction of the reference grating GS.

In order to detect the moving direction, it is necessary to obtain two signals whose phases are relatively shifted by an amount corresponding to one-fourth (¼) of the cycle.

Figure 7:
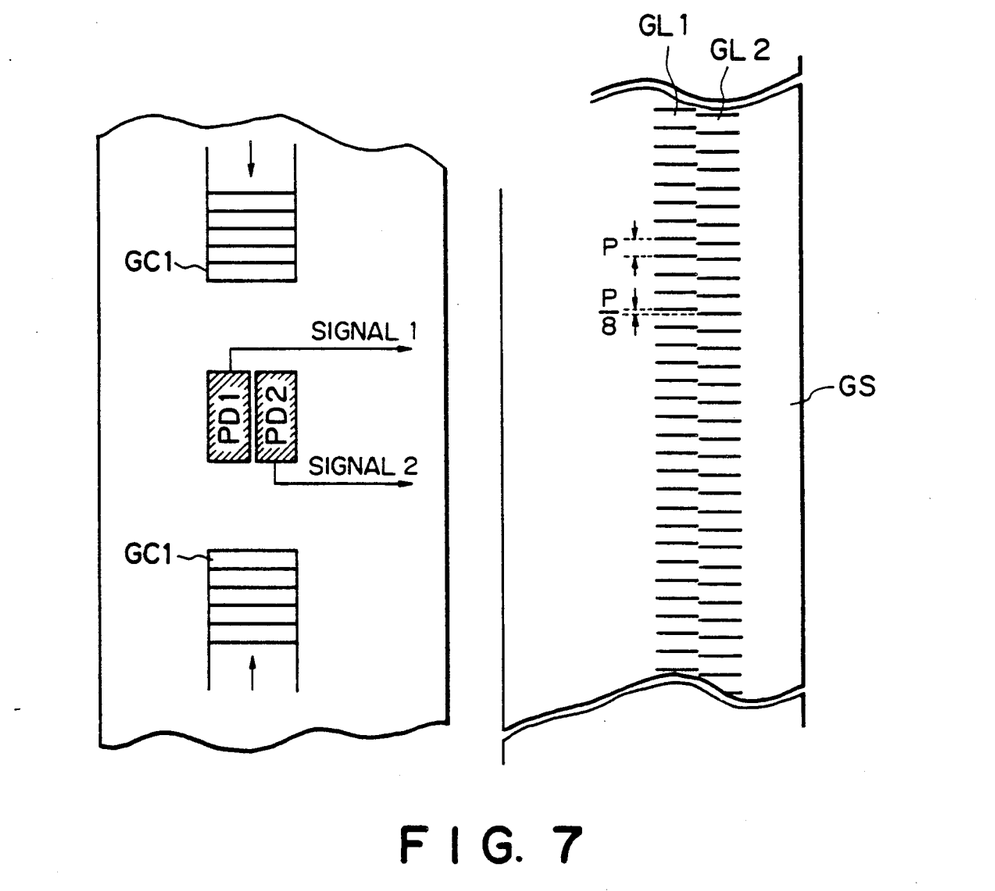
FIG. 7 is an enlarged view showing a major portion of a distance measuring device according to a modified form of the FIG. 6 embodiment.

A specific example is illustrated in FIG. 7, wherein the reference grating GS is formed by two grating arrays GL1 and GL2 whose phases are relatively shifted with respect to the moving direction of the reference grating GS by an amount corresponding to ¼×(m−n) pitch. Additonally, two photoelectric detectors PD1 and PD2 are formed on the base plate SB, correspondingly to the two grid arrays.

Figure 8:
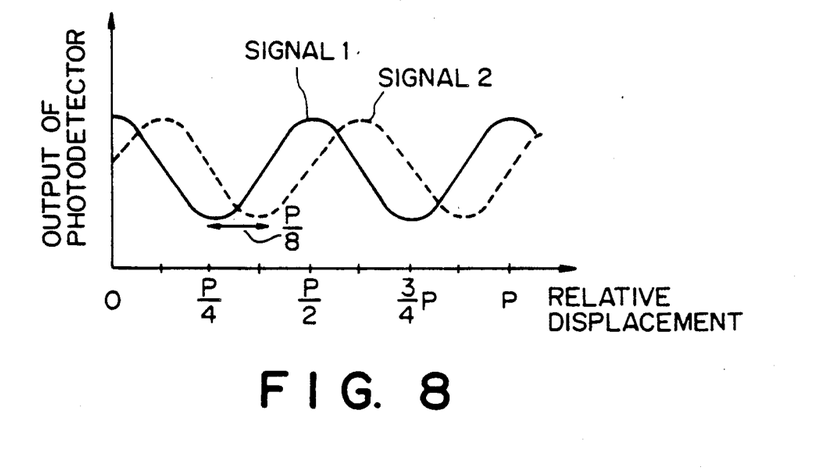
FIG. 8 is a waveform view showing outputs of photodetectors used in the FIG. 7 device.

The diffraction lights from the grid arrays GL1 and GL2, respectively, are received by the different sensors PD1 and PD2 which are spatially separated. By this, signals whose phases are relatively shifted by one-fourth (¼) of the cycle, such as shown in FIG. 8, are obtainable.

Figure 9:
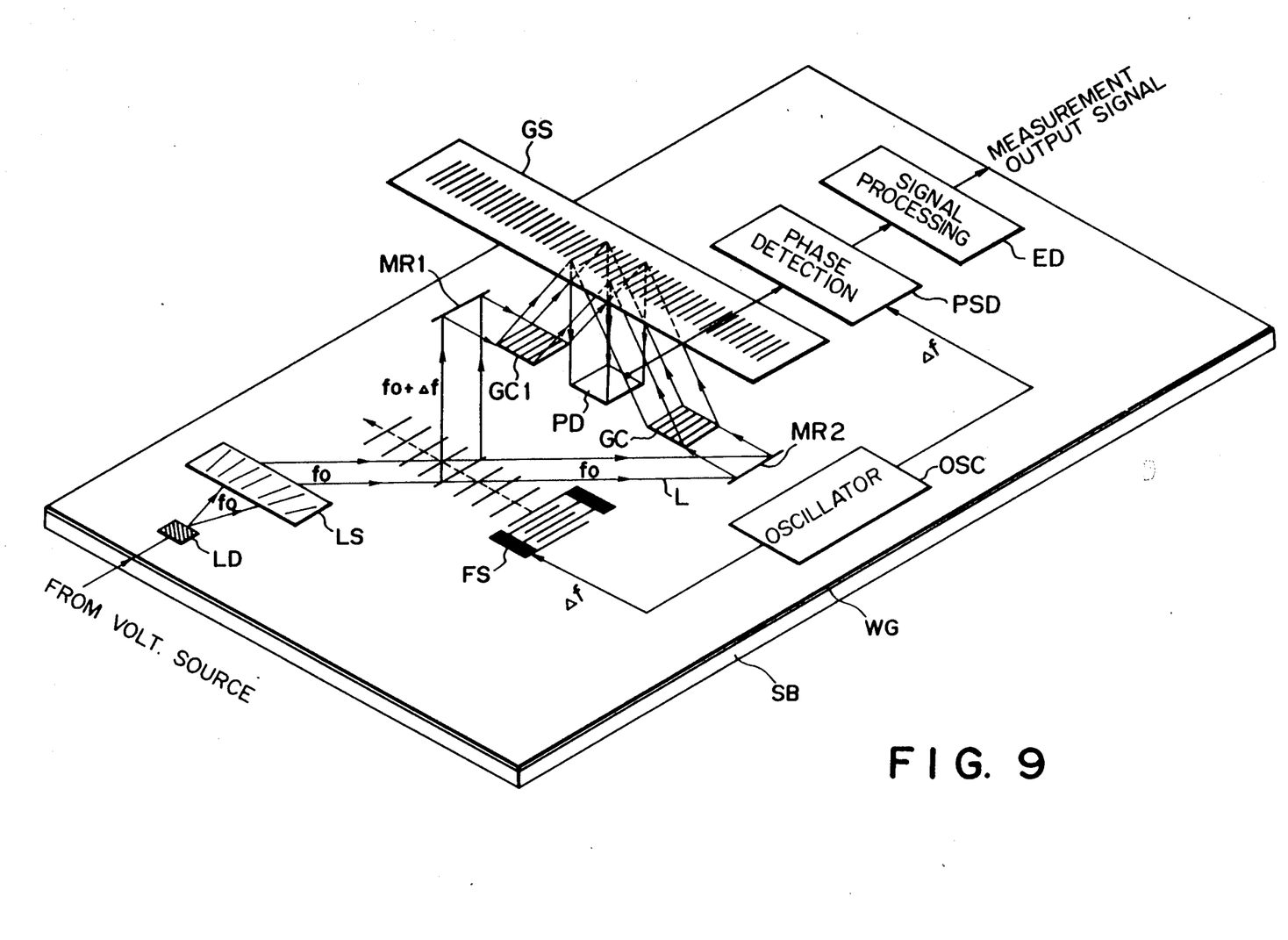
FIG. 9 is a schematic view showing a distance measuring device according to a further modified formed of the FIG. 6 embodiment.

FIG. 9 shows an example wherein a grid interference type distance measuring device is provided as an optical heterodyne measurement device.

In this example, a frequency shifter FS which comprises a surface acoustic wave device, for example, is disposed at the middle of the optical path so that a light wave whose frequency is shifted, with respect to the frequency $f_0$ of the output light from the light source LD, by an amount $\Delta f$ corresponding to the oscillation frequency of an oscillator OSC. Light waves of the frequency $f_0$ and the frequency $f_0 + \Delta f$ are projected upon grating couplers GC1 and GC2 and, by way of these couplers, they are projected upon a reference grating GS having a single grating array. The light diffracted by the reference grating GS is received by a photodetector PD.

The signal which can be directly obtained by the photodetector PD can be expressed as follows:

$$I = I_0 + I_1 \cos[2\pi \cdot X/\{p/(m-n)\}]$$

It is seen therefrom that, by detecting a phase difference with respect to an output signal from the oscillator OSC by use of a phase detecting circuit PSD, the amount of movement of the reference grating GS and the moving direction thereof can be detected as in the case of the foregoing embodiment.

One of the features of the device of the present embodiment lies in that there is no necessity of use of a special grating (see FIG. 7 for example) for the discrimination of the moving direction. Additionally, in a short time, the averaging with respect to time is attainable. Therefore, the amount of movement can be detected very precisely.

In the integrated circuit type distance measuring devices of the FIGS. 6 and 9 examples, a GaAs member is used as the base plate SB. However, the base member may be made of Si. In such case, the light source LD may be provided outwardly.

As described hereinbefore, by integrally providing an optical system (excluding a reference grating) and a signal processing electric system upon a single base member, in a grid interference type distance measuring device, the necessity of assembling adjustment is eliminated and the device can be made stable against disturbance. Further, the size and weight of the device can be reduced, while assuring high-precision measurement.

Usually, in a grid interference type distance measuring device, an optical system includes mirrors or corner cubes. Particularly, mirrors or otherwise is used in an optical system for projecting light upon a grating. However, this leads to a difficulty in the assembling adjustment and a difficulty in making the device compact.

Figure 10:
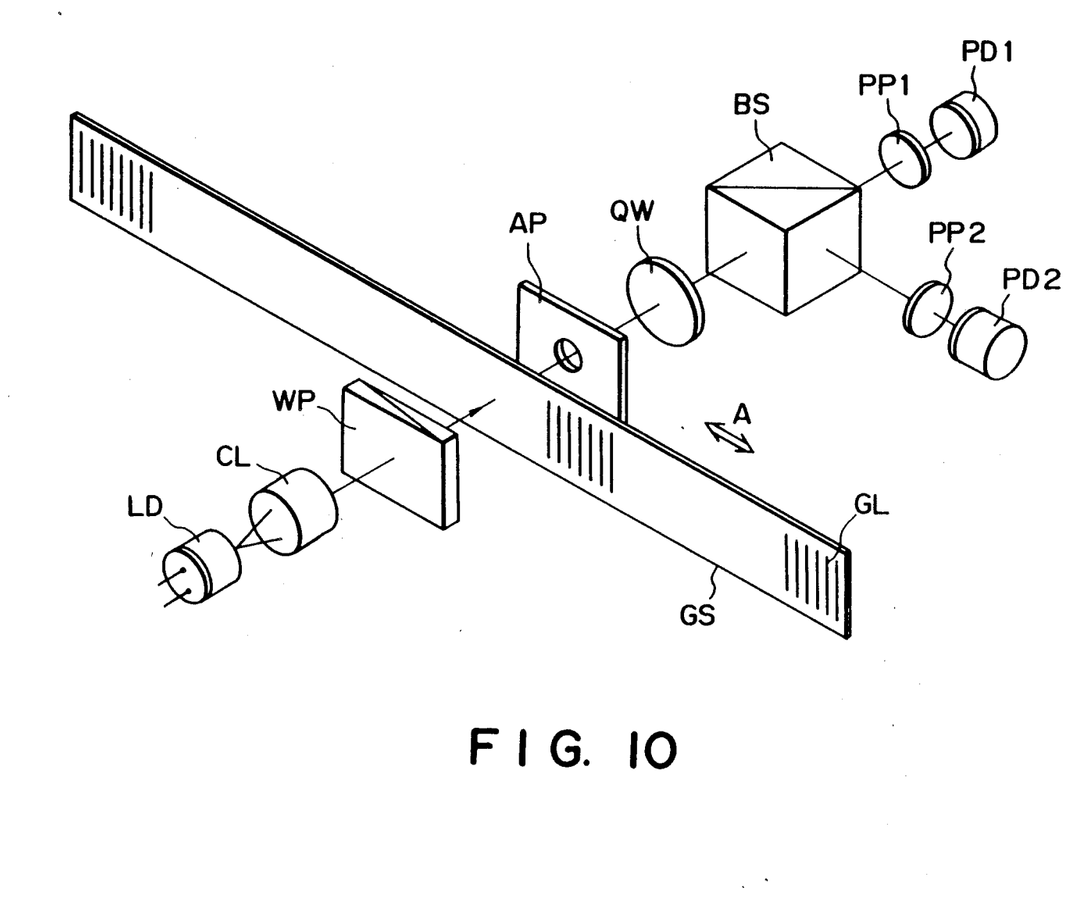
FIG. 10 is a perspective view schematically showing a grating interference type distance measuring device according to a yet another embodiment of the present invention, wherein a Wollaston prism is used.

FIG. 10 shows an example wherein a double refraction prism such as a Wollaston prism is used so as to project a light upon a relatively moving grating, such that an optical system for directing the light to the grating is made simple in structure.

Figure 11:
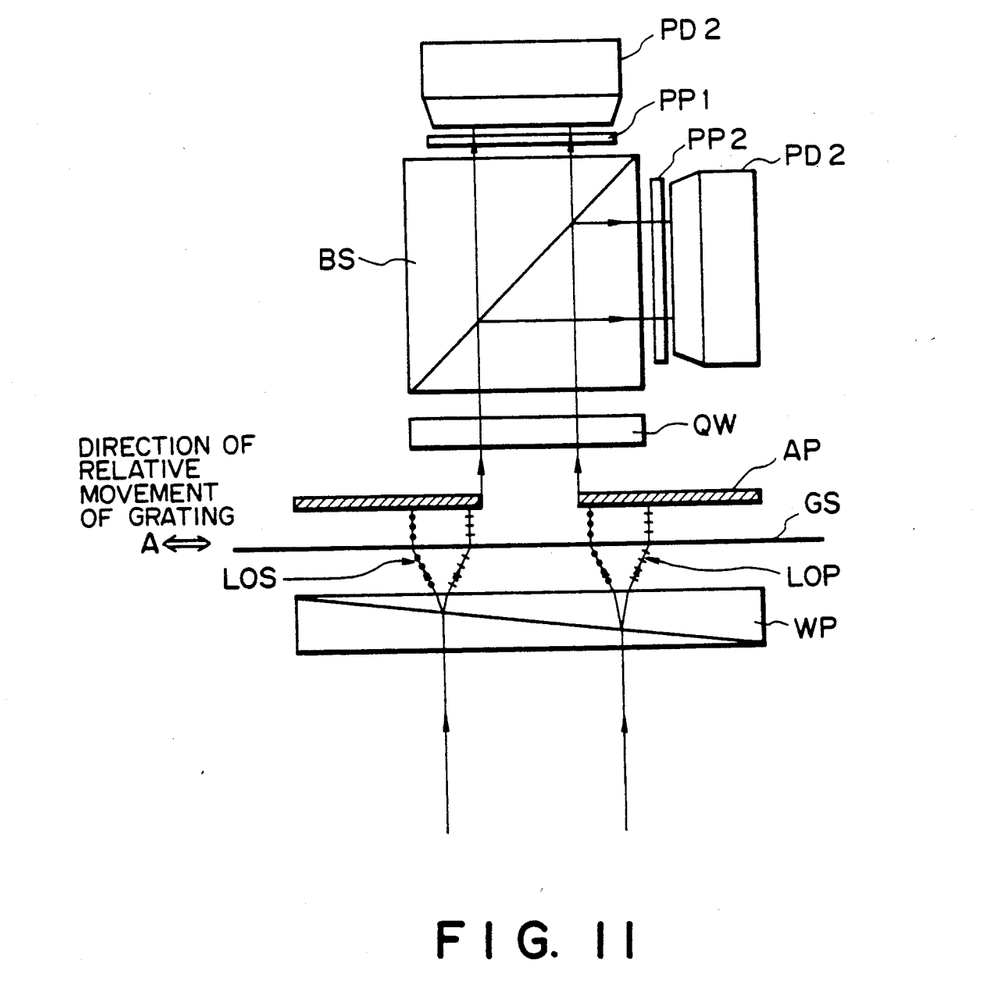
FIG. 11 is a schematic view explicating the function of the Wollaston prism of the FIG. 10 device.

In FIG. 10, a light emitted from a light source LD such as a semiconductor laser or otherwise is transformed into a plane wave by means of a collimator lens CL, and the plane wave thus formed is perpendicularly incident upon a Wollaston prism WP. The Wollaston prism is formed by cementing two double refraction (birefringence) material members (e.g. calcite members) shaped like a prism. The light incident upon the Wollaston prism is divided into two polarized light components perpendicular to each other, and both of the light components can be extracted. FIG. 11 shows this. The light to be projected upon the Wollaston prism WP may be a linearly polarized light having a direction of polarization inclined by 45 degrees with respect to a P-polarized light L0p and an S-polarized light L0s or, alternatively, a circularly polarized light which may be provided by interposing a quarter waveplate between the collimator lens CL and the Wollaston prism WP.

In FIG. 11, the lights emanating from the Wollaston prism WP are such that their P-polarized light components and S-polarized light components have the same angle of incidence with respect to the grating GS, but the angles of incidence of these polarized light components have opposite signs. When these lights pass through a quarter waveplate QW, the P-polarized light and the S-polarized light are converted into circularly polarized light having opposite rotational directions. These circularly polarized lights can spatially interfere with each other. The interfering light is divided by a beam splitter BS into two beams which are directed to two photodetectors PD1 and PD2, respectively, having polarizing plates PP1 and PP2 disposed in front of them, respectively. By doing so, signal outputs such as illustrated in FIG. 3 are obtained and, by effecting the electric processing having been described with reference to the device of FIG. 1, signals of the grating interference type distance meter are obtained. The polarizing plates PP1 and PP2 have their polarization axes shifted by 45 degrees relative to each other.

In the device of FIG. 10, a Rochon prism, a Glan-Thompson prism or otherwise may be used as the double refraction prism. However, where these prisms are used, the relation between the prism used and the light incident upon differs from the relation (perpendicular incidence) as established when a Wollaston prism is used.

Figure 12:
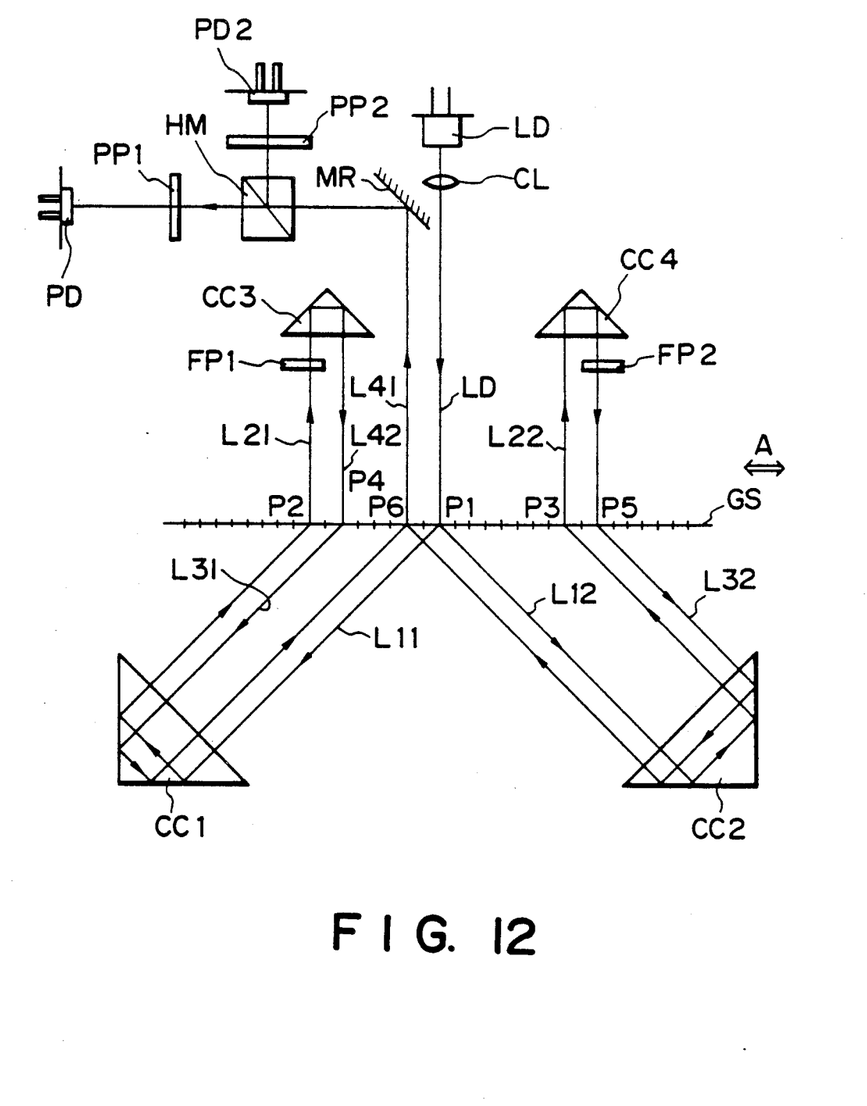
FIG. 12 is a schematic view of a grating interference type distance measuring device according to a still further embodiment of the present invention, wherein light passes through a distance measuring reference grating by four times so as to improve the resolution of the system.

FIG. 12 shows an example of a grating interference type distance measuring device wherein corner cubes are used to bend or deflect optical paths so that each diffraction light goes and returns twice, whereby the number of light division by a distance measuring reference grating GS is increased to eight (8) with a result of increased resolution.

In a distance meter of such structure as disclosed in the aforementioned Japanese Laid-Open Patent Applications, Laid-Open Nos. Sho58-191906 and Sho58-191907, for example, the quantity of light on a photosensor changes at intervals corresponding to one-fourth ($\frac{1}{4}$) of the pitch of a used grating, such as depicted by signals R and S shown in the parts (a) and (b) of FIG. 3. In the grating interference type distance meter disclosed in these Japanese Patent Applications, the period of such a light quantity detection signal (R or S) is electrically divided to increase the number of pulse signals per one pitch of the grating to thereby improve the resolution. However, where the division is made by electrical processing, there is a possibility that the pulse spacing changes with the change in the amplitude of a signal or in the DC level. If this occurs, the precision is degraded.

In the present embodiment, as compared therewith, the optical system of the measuring device is arranged so that the number of times of light diffraction at the distance measuring reference grating GS is increased with a result that the quantity of light upon a photosensor changes, by many times (e.g. eight times), during a time period during which the reference grating GS moves by an amount corresponding to one pitch thereof. With this arrangement, the quantity of light upon the photosensor changes at very short intervals such as, for example, one-eighth of the pitch of the reference grating. Thus, with the optical arrangement itself, the number of divisions with regard to the grating (grating pitch) is increased.

In FIG. 12, the light emanating from a light source LD, which comprises a semiconductor laser, for example, of the grating interference type distance measuring optical system is transformed into a plane wave light L0 by means of a collimator lens CL and then impinges on a point P1 on the distance measuring reference grating GS which is in a relatively movable relation with the distance measuring optical system. The light incident on the reference grating GS is diffracted thereby. Positive and negative N-th order diffraction lights L11 and L12 caused thereby enter into corner cubes CC1 and CC2, respectively, and are reflected thereby, each reflected light travelling in a direction parallel to its oncoming path and reversely. The reflected lights from the corner cubes CC1 and CC2 are incident again on the reference grating GS at points P2 and P3, respectively, and are diffracted again by the grating GS. These diffracted lights denoted at L21 and L22 pass through phase plates FP1 and FP2, respectively, so that the state of polarization of each light is changed. After reflected by corner cubes CC3 and CC4, the lights L21 and L22 come back to the grating GS at points P4 and P5 and are diffracted again by the grating GS. These diffraction lights as denoted at L31 and L32 are reflected again by the corner cubes CC1 and CC2, respectively, and they come back to the grating GS and are incident upon the same point P6 whereat they are diffracted again (the fourth diffraction). The fourth-diffracted lights denoted at L41 and L42 interfere with each other. The interfering light goes to a beam splitter HM by way of a mirror MR, and they are separated into two which are directed by way of polarizing plates PP1 and PP2 to sensors PD1 and PD2, respectively.

The phase plates FP1 and FP2 may comprise quarter waveplates, for example, and are set so that their fast axes are inclined at angles +45 degrees and −45 degrees with respect to the linearly polarized components of the laser beams L21 and L22, respectively. Also, the polarizing plates PP1 and PP2 may be set so as to have angles 0 degree and 45 degrees, respectively. With the above-described arrangement, those signals as having intensities varying with a phase difference of 90 degrees are obtainable at the two sensors PD1 and PD2. Further, where the pitch of the distance measuring reference grating is 2.4 microns and when the order of diffraction at each of various points and times is "±1-st", there are produced at the sensors PD1 and PD2 those signals having 0.3 micron spacing which is one-eighth (⅛) of the pitch of the grating. By dividing the thus determined pulse interval in accordance with the electrical division method described with reference to FIG. 1, for example, pulse signals of a number twice larger than the pulse number just described, that is thirty-two pulses per one pitch with interval of 0.075 microns, are obtainable.

While the invention has been described with reference to the structures disclosed herein, it is not confined to the details set forth and this application is intended to cover such modifications or changes as may come within the purposes of the improvements or the scope of the following claims.

What is claimed is:

1. A device for measuring a relatively moving distance of two relatively moving objects, said device comprising:
   a light source provided on one of the two objects;
   an optical integrated-circuit provided on the one object at a position opposed to the other object, said optical integrated-circuit including a base plate, a waveguide layer formed on said base plate, dividing means provided in said waveguide layer, for dividing a light from said light source into two lights, and emitting means effective to emit each of the two lights defined by said dividing means, outwardly of said waveguide layer and in a predetermined direction;
   a diffraction grating provided on the other object at a position opposed to said optical integrated-circuit, for diffracting each of the lights emitted by said emitting means;
   photodetecting means for detecting a change in the light intensity caused by the interference of the two diffraction lights emitted from said diffraction grating; and
   detecting means for detecting the relatively moving distance of the two objects on the basis of the detection by said photodetecting means.

2. A device according to claim 1, wherein said light source is provided on said base plate.

3. A device according to claim 1, wherein said diffraction grating includes two grating element arrays disposed so that they are relatively shifted in the direction of relative movement of the two objects by an amount corresponding to one-fourth of the cycle of the change in the light intensity due to the interference of the diffraction lights and wherein said photodetecting means is operable to detect the changes in the light intensity of the diffraction lights from said grating element arrays, independently of each other.

4. A device according to claim 1, further comprising a frequency shifter for shifting the frequency of one of the two lights defined by said dividing means and means for detecting the direction of relative movement of the two objects by detecting a phase difference of an output of said photodetecting means with respect to the frequency as shifted by said frequency shifter.

5. A device for measuring a relatively moving distance of two relatively moving objects, said device comprising:
   a light source provided on one of the two objects;
   a diffraction grating provided on the other object, for receiving and diffracting a light emitted from said light source;
   reflecting means for reflecting two diffraction light having different diffraction orders and emitted from said diffraction grating in different direction so that each of the two diffraction lights is further projected, by n times, upon said diffraction grating and is diffracted thereby, wherein n is an odd number not less than 3 and wherein, after the n times diffraction, the two diffraction lights emanate from said diffraction grating in the same direction;
   photodetecting means for detecting a change in the light intensity caused by the interference of the two diffraction lights emitted in the same direction from said diffraction grating; and
   detecting means for detecting the relative moving distance of the two objects on the basis of the detection by said photodetecting means, wherein said reflecting means includes first and second corner cube prisms effective to reflect, respectively, the two lights from said light source and diffracted by said diffraction grating and third and fourth corner cube prisms effective to reflect, respectively, the lights having been reflected by respective corner cube prisms and diffracted by said diffraction grating, and wherein the lights reflected respectively by said third and fourth corner cube prisms are diffracted by said diffraction grating and, then, are reflected by said first and second corner cube prisms, respectively, so that they are incident upon the same location on said diffraction prism and diffracted thereby, such that they emanate from said diffraction grating in the same direction.

6. A device for measuring relative movement of two relatively movable objects, said device comprising:
- a light source means provided on one of the objects, for emitting light;
- a diffraction grating provided on the other object and diffracting light from said light source means;
- first detecting means for detecting a change in intensity of light diffracted by said diffraction grating, due to optical interference;
- second detecting means for detecting relative movement of the first and second objects, on the basis of detection by said first detecting means; and
- an optical integrated element provided on the one object, for forming a part of a path for the light travelling from said light source means to said first detecting means.

7. A device according to claim 6, wherein said optical integrated element forms a path from said light source means to said diffraction grating.

8. A device according to claim 7, wherein said optical integrated element includes dividing means for dividing light from said light source means into two beams, and wherein said optical integrated element directs the two beams to said diffraction grating.

9. An encoder, comprising:
- a diffraction grating; and
- a reading head relatively displaceable to said diffraction grating, wherein said reading head includes;
- light inputting means for inputting coherent light to said diffraction grating for first time impingement thereon;
- first reflecting means for receiving light diffracted by said diffraction grating and for emitting the received light for second time impingement upon said diffraction grating; and
- second reflecting means for receiving light diffracting by said diffraction grating in response to the second time impingement and for emitting the received light for third time impingement upon said diffraction grating, wherein
- said second reflecting means is in such positional relationship with said first reflecting means that light diffracted by said diffraction grating in response to the third impingement is inputted through said first reflecting means again to said diffraction grating for fourth time impingement thereon, wherein
- each of said first and second reflecting means has a function for defining a path for light emission which is codirectional to a path for light reception irrespective of the angle of incidence of the light received thereby, and wherein
- said reading head further includes photodetecting means for producing an output corresponding to a product of interference of light based on the diffraction by said diffraction grating responsive to the fourth time impingement with light supplied from said light inputting means.

10. An encoder according to claim 9, wherein said photodetecting means receives the light diffracted by said diffraction grating in response to the fourth time impingement.

11. An encoder according to claim 9, wherein said first and second reflecting means are in such positional relationship that a path of the light resulting from the diffraction by said diffraction grating and being directed to said photodetecting means and a path of light defined by said light inputting means do not overlap with each other.

12. An encoder according to claim 9, wherein said light inputting means includes a semiconductor laser.

13. An encoder according to claim 9, wherein each of said first and second reflecting means comprising a corner cube.

14. A reading head for use in an encoder having a diffraction grating, said reading head being relatively displaceable to the diffraction grating, said reading head comprising:
- light inputting means for inputting coherent light to the diffraction grating for first time impingement thereon;
- first reflecting means for receiving light diffracted by the diffraction grating and for emitting the received light for second time impingement upon the diffraction grating;
- second reflecting means for receiving light diffracted by the diffraction grating in response to the second time impingement and for emitting the receiving light for third time impingement upon the diffraction grating, wherein
- said second reflecting means is in such positional relationship with said first reflecting means that light diffracted by said diffraction grating in response to the third impingement is inputted through said first reflecting means again to the diffraction grating for fourth time impingement thereon, wherein
- each of said first and second reflecting means has a function for defining a path for light emission which is codirectional to a path for light reception irrespective of the angle of incidence of the light received thereby; and
- photodetecting means for producing an output corresponding to a product of interference of light based on the diffraction by the diffraction grating responsive to the fourth time impingement with light supplied from said light inputting means.

15. A reading head according to claim 14, wherein said photodetecting means receives the light diffracted by the diffraction grating in response to the fourth time impingement.

16. A reading head according to claim 14, wherein said first and second reflecting means are in such positional relationship that a path of the light resulting from the diffraction by the diffraction grating and being directed to said photodetecting means and a path of light defined by said light inputting means do not overlap with each other.

17. A reading head according to claim 14, wherein said light inputting means includes a semiconductor laser.

18. A reading head according to claim 14, wherein each of said first and second reflecting means comprises a corner cube.

* * * * *

UNITED STATES PATENT AND TRADEMARK OFFICE
CERTIFICATE OF CORRECTION

PATENT NO. : 5,000,572

DATED : March 19, 1991

INVENTOR(S) : Noriyuki Nose et al.

It is certified that error appears in the above-identified patent and that said Letters Patent is hereby corrected as shown below:

On the title page, Item :
[56] References Cited:

U.S. PATENT DOCUMENTS

"Mokosch" should read --Makosch--.

"Taniyuchi et al." should read --Taniguchi et al.--.

[57] ABSTRACT:

Line 21, "photodetecting." should read --photodetecting system.--.

COLUMN 2:

Line 44, "by" should be deleted.

COLUMN 6:

Line 32, "$I=I_0+I_1\cos[2(X/0.8)]$" should read --$I=I_0+I_1\cos[2\pi(X/0.8)]$--.

UNITED STATES PATENT AND TRADEMARK OFFICE
CERTIFICATE OF CORRECTION

PATENT NO. : 5,000,572

DATED : March 19, 1991

INVENTOR(S) : Noriyuki Nose et al.

It is certified that error appears in the above-identified patent and that said Letters Patent is hereby corrected as shown below:

COLUMN 7:

Line 19, "$I=I_0+I_1\cos[2\pi.X/\{p/(m-n)\}]$" should read --$I=I_0+I_1\cos[2\pi\Delta ft-2\pi.X/\{p/(m-n)\}]$--.

COLUMN 9:

Line 55, "(5/8)" should read --(1/8)--.

COLUMN 10:

Line 53, "light" should read --lights--.

Line 55, "direction" should read --directions--.

COLUMN 12:

Line 32, "receiving" should read --received--.

Signed and Sealed this

First Day of March, 1994

Attest:

BRUCE LEHMAN

Attesting Officer    Commissioner of Patents and Trademarks